July 12, 1938. W. D. THOMAS ET AL 2,123,292
MACHINE FOR USE IN MANUFACTURING BOOTS AND SHOES
Filed Dec. 28, 1936 7 Sheets-Sheet 2

July 12, 1938.   W. D. THOMAS ET AL   2,123,292
MACHINE FOR USE IN MANUFACTURING BOOTS AND SHOES
Filed Dec. 28, 1936   7 Sheets-Sheet 3
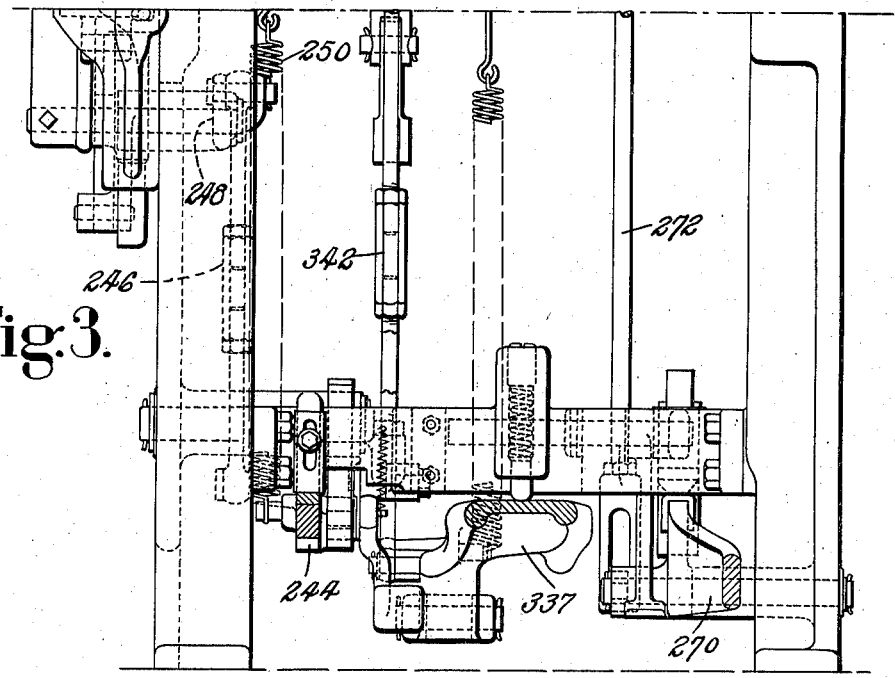
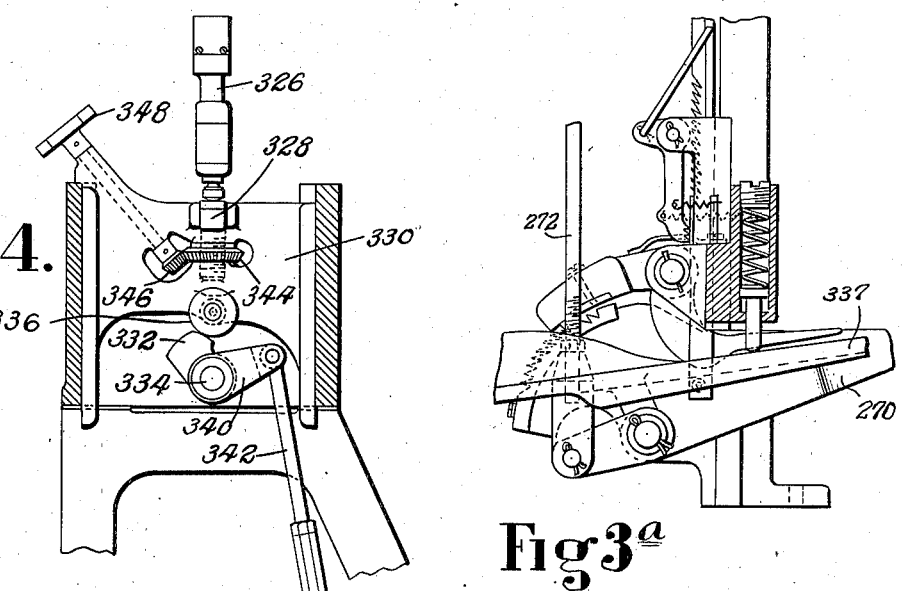

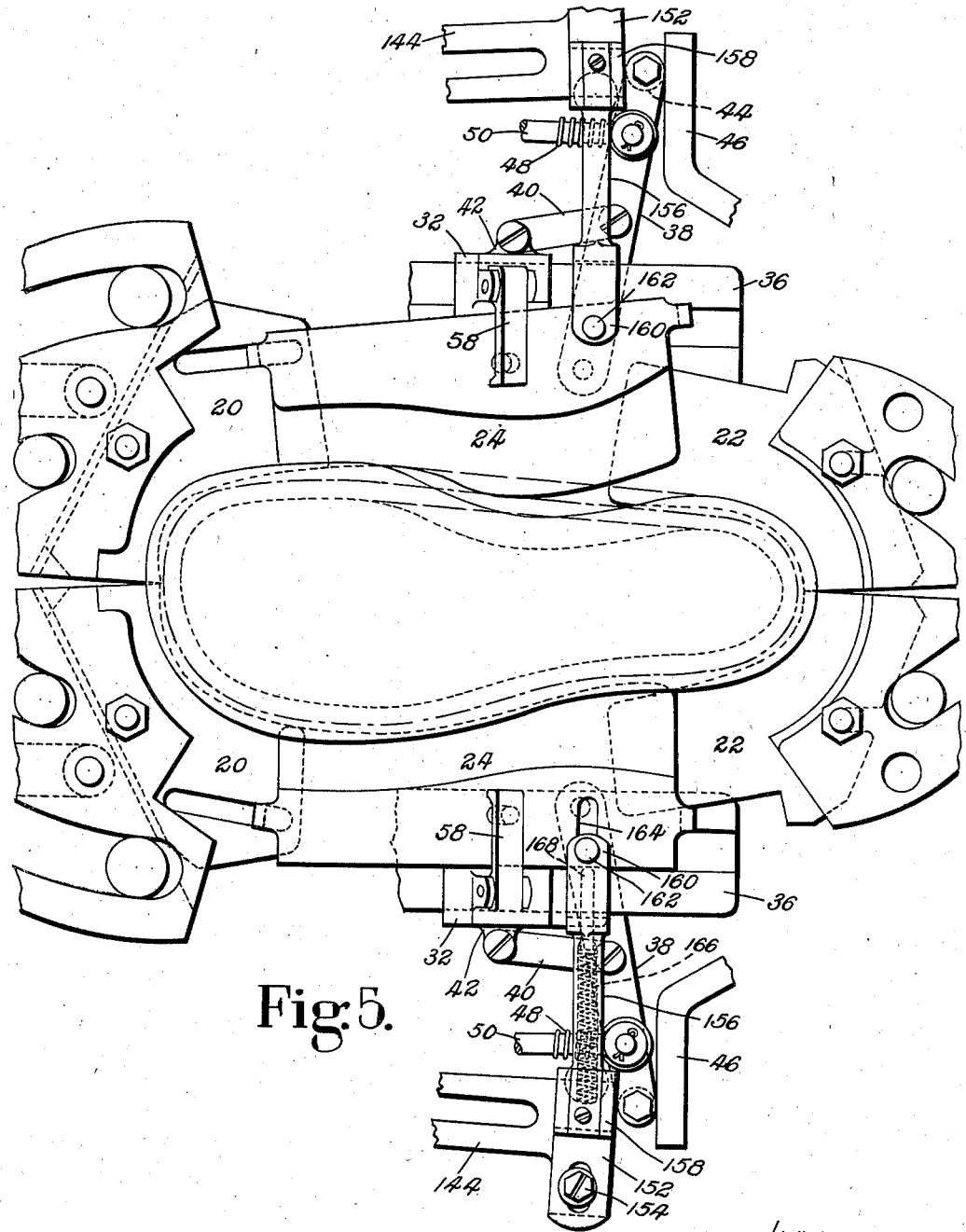

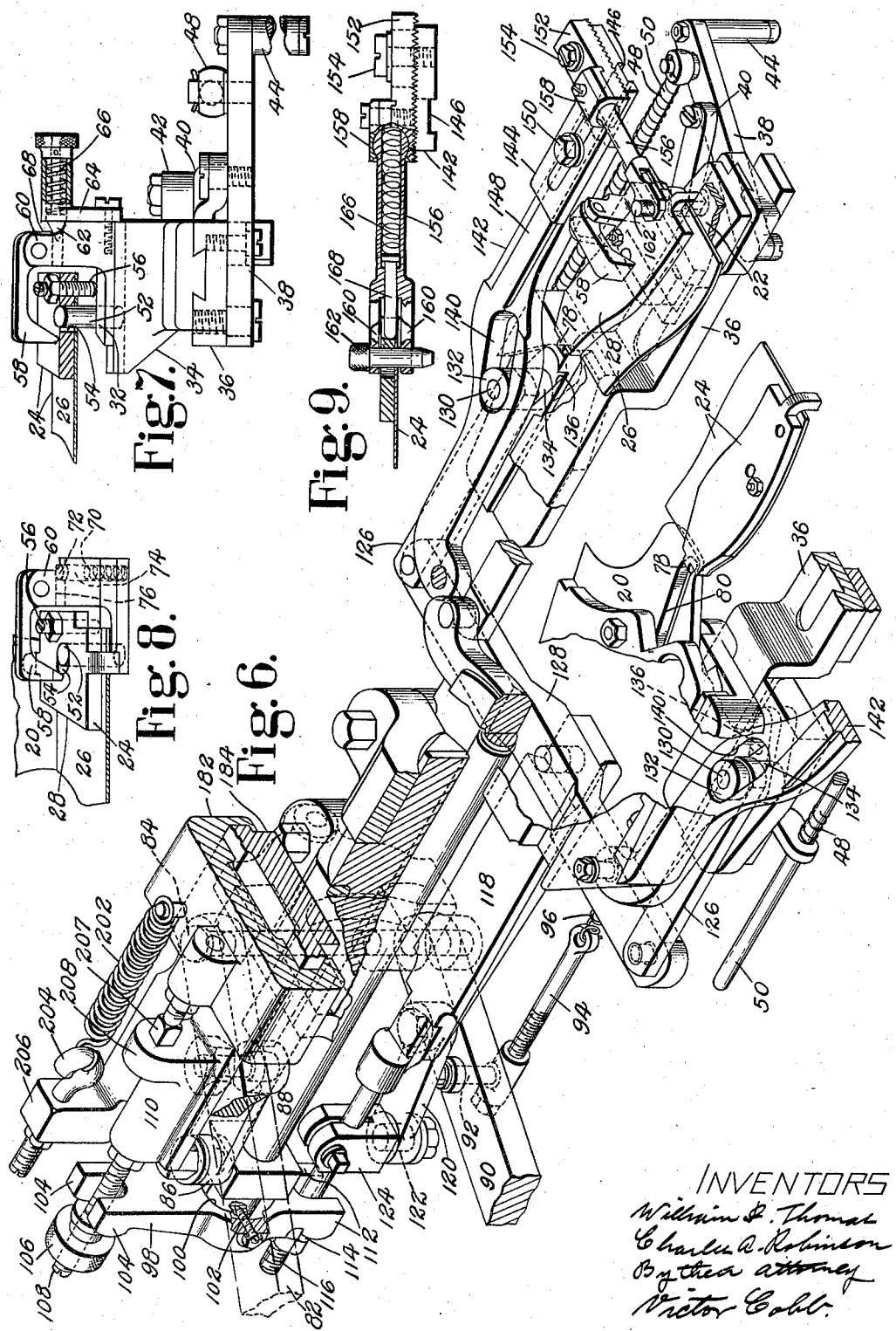

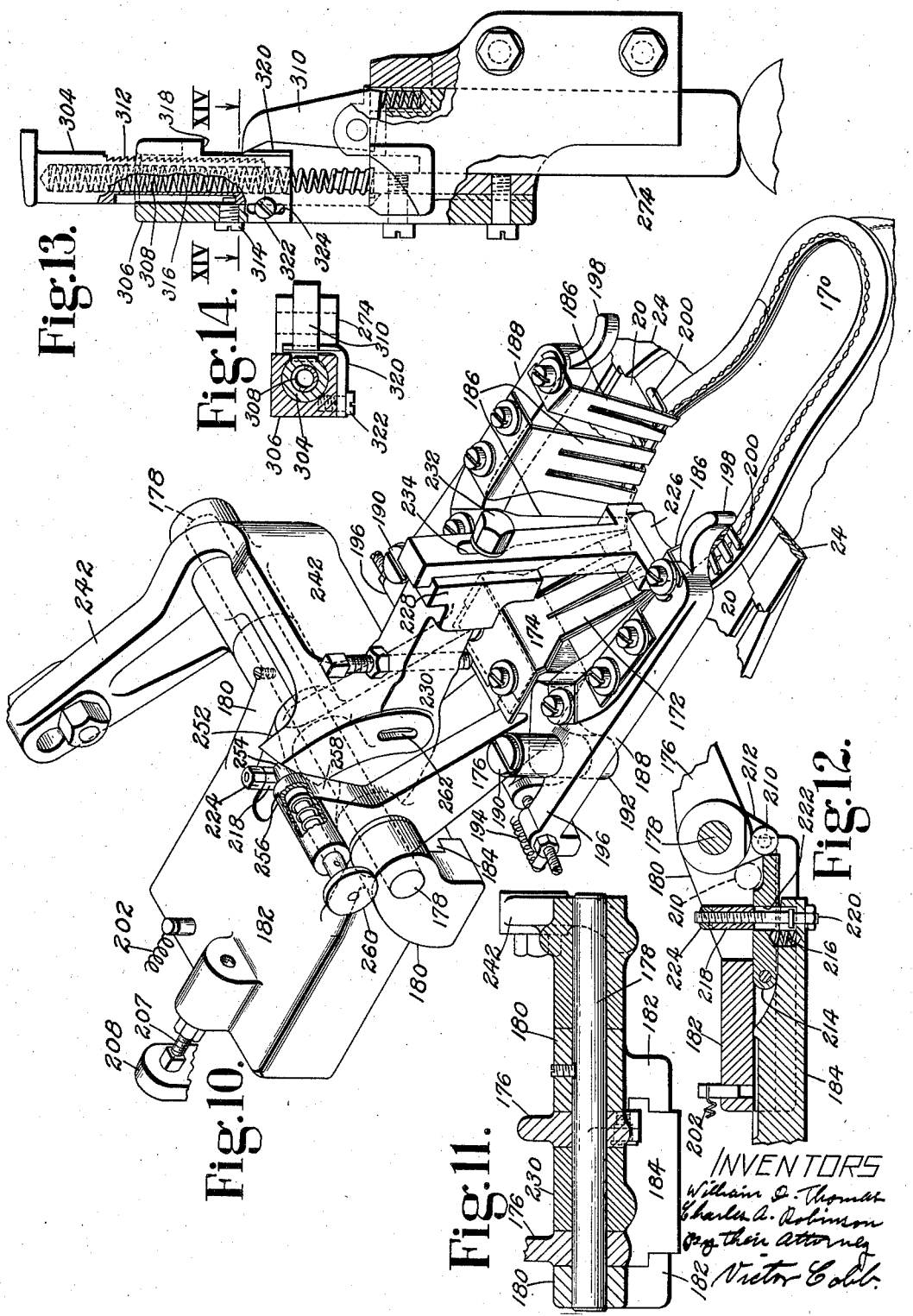

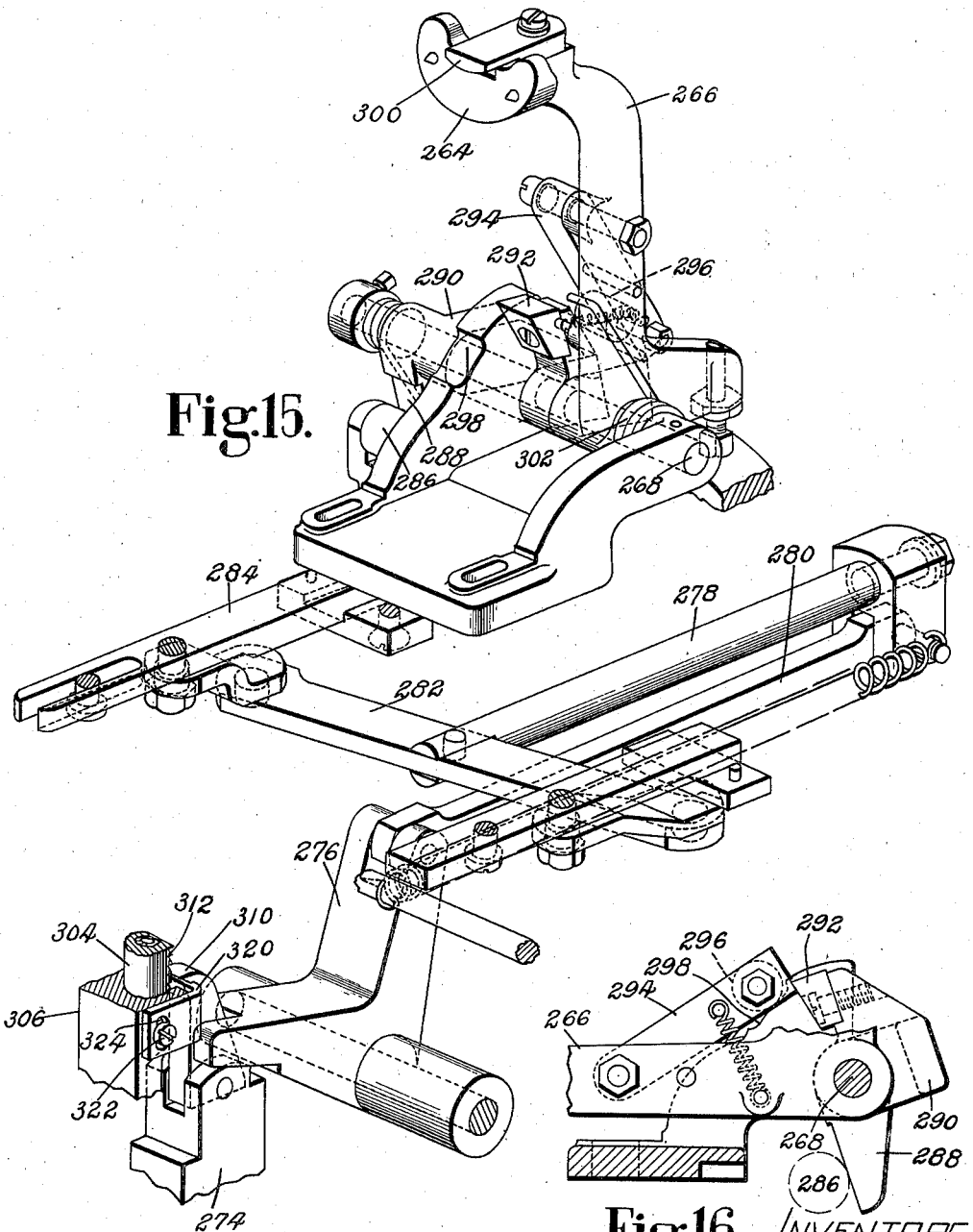

Patented July 12, 1938

2,123,292

UNITED STATES PATENT OFFICE 2,123,292

MACHINE FOR USE IN MANUFACTURING BOOTS AND SHOES

William D. Thomas, Lynnfield, and Charles A. Robinson, Salem, Mass., assignors to United Shoe Machinery Corporation, Paterson, N. J., a corporation of New Jersey Application December 28, 1936, Serial No. 117,728

33 Claims. (Cl. 12—7)

The present invention relates to machines for use in the manufacture of boots and shoes and is herein illustrated in its application to the manufacture of pre-welted shoes, that is, shoes in the manufacture of which a welt is stitched to the upper before the upper is lasted. The invention is illustrated as embodied in a bed lasting machine of the type disclosed in United States Letters Patent No. 1,018,477, granted February 27, 1912 on an application of Matthias Brock. A machine of this type reorganized for use in the manufacture of pre-welted shoes is disclosed in United States Letters Patent No. 2,042,518, granted June 2, 1936 on an application of Karl Engel and a reorganization of the machine of the Engel patent is disclosed in an application for United States Letters Patent Serial No. 43,567, filed October 4, 1935 in the name of René E. Duplessis. While the invention is herein illustrated in its application to the manufacture of pre-welted shoes, it is to be understood that the invention is not thus limited in its scope but is applicable in certain of its aspects to the manufacture of other types of shoes such, for example, as shoes in which the lasting margin of the upper is turned outwardly and secured in that position to a sole.

Objects of the present invention are to improve the construction and operation of prior machines of the type above referred to with a view to improving the work performed by such machines, particularly on pre-welted shoes, and increasing their production.

In the machine illustrated in the Duplessis application above referred to there are provided toe-lasting wipers, heel-lasting wipers, and side-lasting wipers upon which an inverted pre-welted upper is supported by the engagement of the wipers between the welt and the upper at the outer surface of the upper, said region of the upper being hereinafter referred to as the welt crease. Said machine is also provided with a depressor for forcing the forepart of a last into a supported upper and with fingers for clamping the welted margin at the forepart of the upper against the wiper plates and for guiding the last during its movement into the upper. In the machine of the Duplessis application the depressor and the upper-engaging fingers are operated by a common actuator and the organization of the machine is such that the upper-engaging fingers after their retraction are still positioned over the forepart of the shoe and movement of the finger carrier away from the toe end of the shoe is required to provide clearance for the removal of the shoe from the machine. In the machine of the present invention the upper-engaging fingers are sufficiently retracted so that no further movement of the fingers is required. This result is effected in the illustrated machine by providing novel means for retracting the depressor and the upper-engaging fingers substantially to the same extent.

I have found it desirable not only to cause the upper-engaging fingers to press the welt downwardly against the supporting wiper plates but also to press the welted margin outwardly thereby to cause the wipers to extend into the welt crease to the seam which unites the welt to the upper. This result is effected at the opposite sides of the forepart of a shoe in the machine by providing a finger organization wherein the fingers which operate at the sides of the forepart are relatively movable widthwise of the upper thereby to press said side portions of the upper outwardly against the wiper plates. For this purpose, the illustrated construction comprises novel finger carriers constructed and arranged for movement toward and from each other widthwise of the upper, and yielding means for moving the carriers from each other.

The illustrated machine is provided with a sole-laying member or pad whereby a cement-treated outsole is pressed against the bottom of a lasted shoe supported in the machine. The illustrated sole-laying mechanism is substantially the same as that disclosed in the patent to Engel above referred to. It has been found desirable to press the last upwardly against the wipers to position it for the sole-laying operation. In the illustrated machine such upward movement of the last is effected by novel mechanism comprising a work-supporting cam which operates on one of the work supports, for example the toe post, to hold it against downward movement, and manually-operated means for operating the cam thereby to lift the toe post into a predetermined position heightwise of a shoe in the machine. For the same purpose there is provided a work-supporting slide which in the illustrated machine operates against the support for the heel portion of the last, yielding means for moving the slide to bring the heel rest into engagement with the last, manually-operated means for positively pressing the heel rest against the shoe, and means herein illustrated as a pawl and ratchet mechanism for holding the heel rest from return movement.

In lasting pre-welted shoes in machines of the type above referred to some difficulty has been experienced in maintaining proper engagement of the wipers, particularly the side-lasting wipers, within the welt crease of an upper in the machine and it is sometimes necessary to release the wipers and begin the lasting operation anew when the wipers fail properly to engage the entire welted margin. In the illustrated machine it is never necessary to begin the lasting operation anew when one of the side wipers fails to engage the upper properly since the present invention provides, in connection with the end-lasting wipers and the side-lasting wipers, novel wiper-actuating mechanism comprising means for simultaneously advancing the toe wipers and the side wipers, and manually-operated means for operating the side wipers independently of the toe wipers, the heel wipers being independently operated, as usual in machines of this type.

Other features of the invention include novel means for removably securing the side wipers to their carriers, for positioning the side wipers lengthwise of a shoe in the machine relatively to the end wipers, and for positioning the side wipers relatively to the width of the shoe.

These and other features of the invention will now be described with reference to the accompanying drawings and will be pointed out in the appended claims.

In the drawings,

Fig. 3 is a side elevation of the lower portion of the machine illustrated in Fig. 1;

Fig. 3a is a detail elevation illustrating the latch mechanism for the treadle 270;

Fig. 4 is a view in elevation illustrating the toe post and mechanism for pressing it upwardly against a shoe in the machine;

Fig. 5 is a plan view illustrating particularly the side wipers and parts of their operating connections;

Fig. 6 is a perspective view illustrating particularly the mechanism for operating the side wipers;

Fig. 7 is a detail view in elevation illustrating one form of mechanism for removably securing the side wipers to their carriers;

Fig. 8 is a view similar to Fig. 7 showing another form of side-wiper-securing mechanism;

Fig. 9 is a detail view of part of the side-wiper-operating mechanism;

Fig. 10 is a perspective view illustrating the last depressor, the forepart-engaging fingers, and related mechanism;

Fig. 11 is a sectional elevation taken substantially on the line of the shaft 178 illustrated in Fig. 10;

Fig. 12 is a sectional view of the finger carrier and parts thereon taken on the line XII of Fig. 1;

Fig. 13 is a detail view of the mechanism for supporting the heel end of the last;

Fig. 14 is a sectional view taken substantially on the line XIV—XIV of Fig. 13;

Fig. 15 is a perspective view of the mechanism for clamping the heel portion of the welt against the heel wipers, and Fig. 16 is a detail view illustrating part of the mechanism shown in Fig. 15 in a different position.

Figure 1:
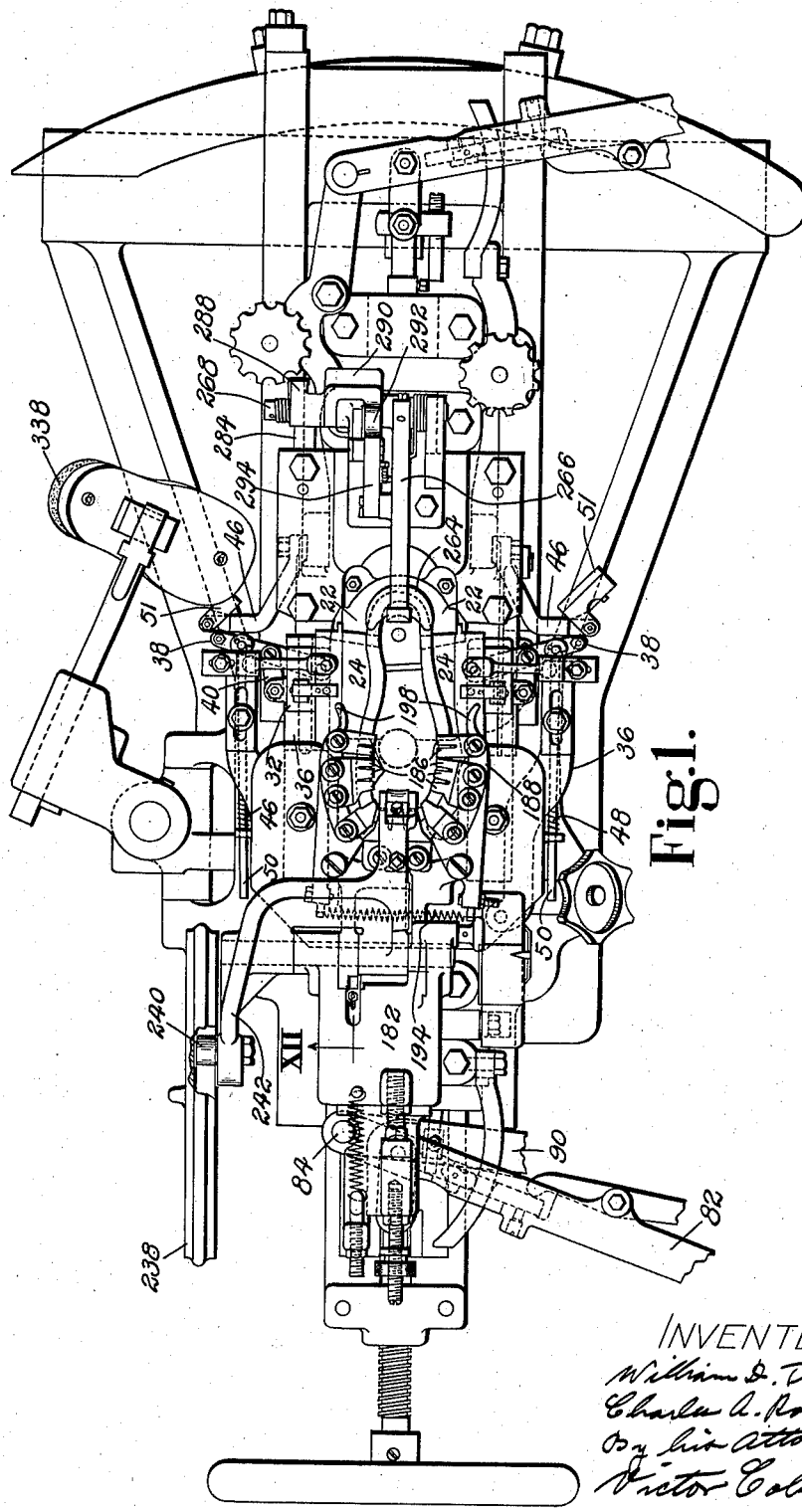
Fig. 1 is a plan view of a bed lasting machine embodying the features of the present invention.

In common with prior machines of the illustrative type, the machine illustrated in the drawings is provided with toe-lasting wipers 20 (Fig. 5) and heel-lasting wipers 22. In common with the machine illustrated in the application filed by René E. Duplessis and above referred to, the machine illustrated in the drawings is provided with side-lasting wipers 24 the end portions of which overlie and are supported by the toe wipers and heel wipers, respectively. As in the machine illustrated in the Duplessis application, the wipers herein illustrated support a pre-welted upper by its welt while a last is forced into the upper through its bottom opening and are then advanced to last the welted margin over the last bottom or over an insole thereon, the wipers remaining advanced to support the welt while an outsole is cement-attached thereto. The lasting wipers engage the upper in the welt crease, the lasting margins of the wiper being thin enough to permit them to engage the upper within the welt crease without misplacing the welt or excessively straining the welt seam. As illustrated in Fig. 6, the side-lasting wipers 24 each comprise a thin flexible wiper plate 26 the wiping edge of which is shaped to conform to the edge of the ball and shank portions of the last bottom at one side of the shoe. Each plate 26 is secured to a frame member 28 which is so shaped that it bends the plate into conformity to the profile of that portion of the last bottom upon which it operates. As illustrated in Fig. 6, the inner edge faces of the frame members 28 are set back sufficiently from the wiping edges of the plates 26 to expose marginal surfaces of the plates 26 which are of sufficient width to receive the welt of a pre-welted upper and support it during the lasting and sole-laying operations. Referring now to Fig. 7 illustrating one of the side-wiper assemblies, the side wiper 24 illustrated therein is mounted on a slide 32 which has dovetail tongue and groove connections with a carrier member 34 permitting movement of the slide on the carrier widthwise of an upper in the machine. The carrier 34 has dovetail tongue and groove connections to an arm 36 extending rearwardly of the upper from that portion of the frame on which the toe head of the machine is mounted, said connections extending generally lengthwise of the upper. For automatically positioning the side wiper lengthwise of the upper, a lever 38 (Figs. 5 and 6) is pivoted at one end thereof to the rearward extremity of the arm 36 and has pivoted midway between its ends one end of a link 40 the opposite end of which is pivoted to a lug 42 projecting outwardly from the carrier 34. The free end of the lever 38 carries a downwardly extending roll 44 which is held against a bracket 46 (Fig. 1) by a spring 48 (Fig. 6) surrounding a rod 50 one end of which is pivoted to the lever 38 and the other end of which is slidably mounted in a bracket projecting outwardly from the frame of the toe head. The range of sizes of uppers upon which the illustrated machine is adapted to operate is limited by the extent to which the levers 38 can swing to bring the rolls 44 into engagement with the brackets 46, but if desired the range of sizes of uppers upon which the machine can operate can be extended by the employment of abutment members 51 (Fig. 1) pivotally mounted at the ends of the brackets 46 respectively for swinging movement to and from position to be engaged by the rolls 44. The inner or wiping edges of the side wipers 24 are positioned in alinement with the wiping edges of the toe wipers 20 by the engagement of a lug 78 at the forward end of each of the side wipers within a groove 80 in each of the toe wipers 20.

For holding the side wipers 24 on their slides 32, two alternative constructions are provided one of which is illustrated in Fig. 7 and the other in Fig. 8. Referring first to the construction illustrated in Fig. 7, the illustrated wiper 24 is held from movement lengthwise of the upper by a stud 52 which projects upwardly from the slide and through an opening 54 in the wiper. The outer margin of the wiper is supported on the slide 32 by the engagement of a screw 56 extending downwardly through a tapped hole in the wiper with the upper surface of the slide. The screw 56 is in alinement with the opening 54 widthwise of the wiper and provides a fulcrum on which the wiper may rock about an axis extending generally widthwise of the upper in order to permit the wiper to be arranged at an inclination such that its forward margin is supported on one of the toe wipers 20 while its rear margin is supported on the corresponding heel wiper 22. It will be understood that the opening 54 is slightly wider than the diameter of the stud 52 in order to permit rocking movement of the side wiper sufficient to allow the required range of angular adjustment. For securing the side wiper 24 against upward movement relatively to the slide 32 the construction illustrated in Fig. 7 includes a finger 58 which is pivoted at one end thereof between lugs 60 projecting upwardly from the slide 32 and arranged to position the finger for swinging movement in a plane extending generally widthwise of an upper in the machine. The finger 58 is locked in wiper-engaging position by a detent 62 which is mounted in a bracket 64 having a hollow cylindrical portion projecting outwardly from the slide 32, said detent being provided with a spring 66 which is confined between the head of the detent and the end wall of the hollow portion of the bracket 64. When the finger 58 is in operative position, as illustrated in Fig. 7, the beveled upper surface of the head of the detent 62 engages a corresponding surface in a downward extension 68 of the finger and positively holds the side wiper 24 from upward movement relatively to the slide 32. When it is desired to remove the wiper 24 the detent is retracted sufficiently to disengage it from the downward extension 68 of the finger whereupon the finger is swung upwardly, leaving the wiper free to be removed from the slide 32. The finger 58 is so positioned that it engages the wiper adjacent to the opening 54 and does not interfere with the angular adjustment of the wiper above referred to. The wiper-holding means illustrated in Fig. 8 differs from the mechanism illustrated in Fig. 7 only in that the finger 58 is yieldingly held in wiper-engaging position by a spring 70 which is seated in a socket in an upward extension 72 of the slide 32 and operates against a pin 74 slidably mounted in the upper portion of said socket and arranged to engage a downward extension 76 of the finger 58.

For operating the toe wipers 20 the illustrated machine is provided with a lever 82 part of which is indicated by broken lines in Fig. 6. The lever 82 is pivoted at one end thereof to a headed stud 84 which projects upwardly from a lug at one side of the toe head. The lever 82 has pivoted to its under surface one end of a link 86 the other end of which is pivoted to a plunger 88 which is slidably mounted in the toe head of the machine and is provided with connections to the toe wipers 20 such as are common to machines of this type. For operating the side wipers 24 the illustrated machine is provided with a lever 90 which is pivoted at one end thereof to the lower end of the stud 84 on which the lever 82 is pivoted. Journaled in the lever 90 is a pin 92 which carries at its lower end an internally threaded cylindrical crosshead within which there is mounted the threaded end of a link 94 the free end of which carries one end of a tension spring 96 the opposite end of which is secured to the toe head. The spring 96 continually urges the lever 90 in a direction to advance the side wipers 24 through connections to be described. The advancement of the side wipers 24 by the action of the spring 96 on the lever 90 is limited and controlled by connections from the plunger 88 to the lever 90 whereby the advancement of the side wipers by the spring 96 takes place during the corresponding advancement of the toe wipers 20. Said connections, as illustrated in Fig. 6, include a member 98 which is provided with a hole 100 through which the plunger 88 extends, said plunger being somewhat less in diameter than the hole. The member 98 is swiveled on the plunger 88 by means of pivot screws 102 which are mounted in tapped holes in opposite sides of said member and extend horizontally toward the center of the hole 100 and have their conical inner ends seated in suitable bearings provided in the plunger 88. The member 98 has at its upper end upwardly projecting ears 104 which engage a knurled thumb nut 106 which is mounted on a threaded stud 108 projecting from a block 110 secured to the top plate of the toe head and positioned parallel to the plunger 88. At its lower end the member 98 has downwardly extending ears 112 which operate against a stop nut 114 on a rod 116 which projects from a slide 118 and is arranged parallel to the plunger 88 and in a plane common to the plunger and the stud 108. The slide 118 is actuated by the lever 90 to operate the side wipers 24, said slide being connected to the lever 90 by a link 120 one end of which is pivoted to a stud 122 projecting downwardly from a split clamp 124 on the rod 116 and the other end of which is pivoted to the lever 90. The spring 96 continually urges the lever 90 in a direction to advance the side-lasting wipers 24 and it will be understood that this action of the spring 96 is limited by the engagement of the stop nut 114 with the member 98. It will also be understood that as the plunger 88 advances to operate the toe-lasting wipers 20 the spring 96 advances the slide 118 in proportion to the advancement of the plunger, the member 98 swinging about its pivotal connection with the plunger 88 as the plunger advances. The retracted position of the side wipers 24 is determined by the adjustment of the thumb nut 106 against which the member 98 operates. During the retraction of the plunger 88 the member 98 is operated thereby as a lever of the third kind to retract the slide 118, the member 98 pivoting on the thumb nut 106 and acting against the stop nut 114. The connections from the slide 118 to the side-lasting wipers 24, which are substantially the same in most respects as in the machine illustrated in the Duplessis application above referred to, comprise a pair of links 126 which are pivoted at oposite ends of a crosshead 128 at one end of the slide 118. The free ends of said links carry pins 130 which project both upwardly and downwardly from the links and have cam rolls 132 mounted at their upper ends and cam rolls 134 mounted at their lower ends. The lower cam rolls 134 travel in cam slots 136 provided in the plate on which the toe wipers are supported, said slots converging rearwardly of an upper in the machine. The upper cam rolls 132 travel in cam slots 140 provided in arms 142 which are pivoted to the top plate (not shown) of the toe head. The cam slots 140 diverge rearwardly of an upper in the machine and each of said slots diverges rearwardly of the upper relatively to the corresponding slot 136. When the cam rolls move rearwardly of an upper in the machine the arms 142 are swung toward each other thereby advancing the side-lasting wipers 24 through connections illustrated in Figs. 5 and 6 comprising a pair of slides one of which is illustrated at 144 in Fig. 6. The slide 144 is provided with a dovetail groove 146 which receives a corresponding tongue 148 extending lengthwise of the arm 142. The slide 144 is secured to the arm 142 by a clamping screw 150 which extends through a slot in the slide and into a tapped hole in the arm. The slide 144 carries a pivot block 152, said block being secured to the slide by a clamping screw 154 which extends through a slot provided in the block and into a tapped hole in an outward extension of the slide. Referring now to Fig. 9, the inner end of the pivot block 152 is provided with a hemispherical recess within which there is pivoted the ball end of a hollow link 156, said link being held in said recess by a plate 158 which has a corresponding recess. At its inner end the link 156 is provided with parallel fingers 160 which are spaced from each other somewhat more than the thickness of the outer margin of the sidelasting wiper plate 24. The fingers 160 are pivoted to the rear portion of the wiper by a removable knurled headed pin 162 which extends through suitable holes in the fingers and the plate, the hole in the plate being somewhat larger than the pin in order to permit a limited vertical swiveling movement of the link upon its pivotal connection with the wiper. The sidelasting wiper plate 24 illustrated in Figs. 6 and 9 is constructed to operate on that portion of the shank having the greatest inward curvature, commonly called the inside of the shank. The operating connections to the side-lasting wiper which operates at the outside of the shank correspond to the connections above described in all respects excepting the pivotal connection of the hollow link to the wiper. Referring now to Fig. 5, it will be seen that the side wiper 24 which operates at the outside of the shank is provided with a transverse slot 164 for the reception of the pivot pin 162. The pivot pin is yieldingly held at the outer end of the slot by mechanism illustrated in Figs. 5 and 9 comprising a compression spring 166 mounted in the hollow link 156, one end of said spring bearing against the pivot block 152 and the plate 158 while its opposite end bears against the head of a pin 168 slidably mounted in the link and urges said pin against the outer edge face of the wiper plate. The spring and pin above described have no function when the link in which they are mounted is secured to a wiper which operates on the inside of the shank since said wiper is not provided with a slot such as the slot 164 in the opposite wiper. When the machine is at rest the side wipers are in a position such as that illustrated in Fig. 5 with the pin 162 in the wiper which operates at the outside of the shank held at the outer limit of the slot 164 by the pressure of the spring 166. As illustrated in Fig. 5 the side wiper at the outside of the shank is positioned to support the upper by engagement with its welt while the side wiper at the inside of the shank is sufficiently retracted to permit movement of a last into the supported upper. The side wiper at the inside of the shank may be sufficiently retracted to admit a last into the supported upper and still support the upper by engagement with the welt since the welt at the inside of the shank is substantially straight before the upper is lasted. See the position of the welt indicated by broken lines in Fig. 5. During the advancement of the side wipers 24 the wiper at the inside of the shank must travel farther than the wiper at the outside of the shank and this difference is compensated for by the lost motion afforded by the pin and slot connection between the link 156 and the wiper at the outside of the shank.

After the toe-lasting wipers 20 have been advanced the side-lasting wipers 24 may be further advanced or retracted by manual operation of the lever 90 while the toe wipers remain advanced. Such retraction of the side wipers would be necessary, for example, if one of the side wipers had accidentally engaged part of the sole-attaching face of the welt instead of entering the welt crease.

Referring now to Fig. 10, a pre-welted upper such, for example, as the upper 170 illustrated in said figure, is clamped against the toe wipers 20 to hold it from misplacement while a last is inserted into the heel portion of the upper and then forced downwardly into the forepart of the upper. The illustrated clamping mechanism is similar in its main features to the clamping mechanism provided in the machine illustrated in the Duplessis application above referred to and is somewhat similar to the clamping mechanism disclosed in the Engel Patent No. 2,042,518 above referred to. As illustrated in Fig. 10, the forepart-clamping mechanism comprises a series of clamping fingers 172 extending downwardly from a plate 174 which is bent over and secured to the top of the crossbar of a U-shaped member 176 which is pivoted at its ends on a fixed cross shaft 178 mounted in brackets 180 projecting upwardly from a carrier 182 which, as illustrated in Fig. 6, is slidably mounted on a plate 184 secured to the toe head and arranged to extend generally lengthwise of the upper in the machine. For clamping the opposite sides of the forepart of the upper to the toe-wiper plates clamping fingers 186 which are similar in their construction to the fingers 172 are secured to arms 188 which are pivotally mounted on headed studs 190 which project upwardly from ears 192 extending outwardly from opposite sides of the crossbar of the U-shaped member 176. The arms 188 are yieldingly held at the limit of their movement away from each other by a tension spring 194 connecting extensions 196 of the arms 188. The arms 188 are provided with handles 198 whereby the operator swings the arms toward each other to position the fingers 186 so that they will enter the space enclosed by the welted margin of the upper as the finger assembly swings downwardly into upper-clamping position. After the finger assembly has been moved downwardly into engagement with the welted margin of the upper the operator releases his hold on the handles 198 and permits the spring 194 to swing the arms away from each other and thus to cause the fingers 186 to engage the adjacent edge faces of the welt and upper at opposite sides of the forepart and to press the welted margin outwardly against the toe wipers 20. As in the machine of the Duplessis application above referred to, the upper-engaging fingers are provided with presser feet 200 which engage the sole-attaching face of the welt and press the welt against the margin of the toe wipers 20. The upper-engaging fingers 172 are moved forwardly of the upper to press the toe end of the welted margin against the toe wipers by the operation of a tension spring 202 (Fig. 6) one end of which engages a stud on the carrier 182 while its opposite end engages a hook 204 mounted in a bracket 206 projecting upwardly from the toe head, the movement of the carrier by said spring being limited by the engagement of an abutment screw 207 projecting from a boss on the carrier with an upward extension 208 of the block 110. It will be understood that the finger assembly must move rearwardly of the upper during its downward movement in order that the fingers 172 which engage the toe end of the welted margin may enter the space enclosed by the welted margin of the upper and thereafter move forwardly of the upper to press the welted margin against the toe wipers. In the illustrated machine such rearward movement of the finger assembly is effected by the operation of a roll 210 (Fig. 12) pivoted at the end of a short arm 212 which extends downwardly from the end of one arm of the U-shaped member 176 when said member is in its retracted position. The roll 210 engages the end face of an arm 214 which is pivotally mounted in a recess provided in the upper surface of the plate 184 on which the carrier 182 is slidably mounted. During the downward movement of the finger assembly the roll travels in a clockwise direction, as seen in Fig. 12, about the shaft 178 upon which the finger assembly swings and thus causes the finger assembly to move rearwardly of the upper until such clockwise movement of the roll has raised it above the top of the arm 214, at which time the spring 202 operates on the carrier 182 to move the finger assembly in a direction to bring the fingers 172, which at that time have entered the upper, against the adjacent edge faces of the welt and upper at the toe end of the upper thus to press the welted margin against the toe wipers. During the upward movement of the finger assembly the roll 210 travels in a counterclockwise direction from its position indicated in broken lines in Fig. 12 to its initial position indicated in full lines and during such movement of the roll the arm 214 swings downwardly against the pressure of a spring 216 which operates against the bottom of the arm and supports the arm in its operative position illustrated in Fig. 12. This position of said arm is determined by the engagement of the top of the arm with a collar 218 on a stud 220 which projects upwardly from the plate 184 through a slot 222 in the arm and has at its upper end a stop nut 224 which may be adjusted to vary the operative position of the arm. For forcing the forepart of a last into the supported upper the illustrated machine is provided with a depressor member or bar 226 (Fig. 10) which is mounted in a grooved crosshead 228 at the end of an arm 230 which is journaled on the fixed shaft 178. The bar 226 is secured in the crosshead 228 by a clamping screw 232 and is vertically adjustable within the range of a screw-receiving slot 234 provided in the bar. For operating the depressor the illustrated machine has a vertical slide 236 (Fig. 2) provided with a head 238 having a horizontal slot which carries a roll 240 (Fig. 1) pivotally mounted at the end of an arm 242 journaled on the fixed shaft 178, said arm being an offset extension of the arm 230 which carries the depressor member 226. The slide 236 is moved upwardly by a treadle 244 (Fig. 3) through connections comprising a link 246, a lever 248 and a link (not shown) projecting upwardly from the rear end of the lever and connected to the lower end of the slide. The slide 236 is moved downwardly to return the depressor to its elevated position by a spring 250 which operates on the treadle 244. During the return movement of the depressor a short extension 252 of the depressor arm 230 engages a spring-pressed pin 254 mounted in a horizontal cylindrical arm 256 projecting outwardly from the upper end of an upward extension 258 of the finger-supporting member 176. The pin 254 is provided with a head 260 to facilitate manual retraction of the pin to disengage it from the bracket 252 to permit the finger assembly to be moved downwardly to bring the fingers into engagement with the upper while the depressor remains in its elevated position. During such downward movement of the finger assembly the pin 254 enters an arcuate slot 262 provided in the arm 230 and thus provides a connection between the treadle-actuated arm 242 and the finger assembly whereby the finger assembly may be forced downwardly with sufficient pressure to cause the presser feet 200 on the fingers to press the welt at the forepart of the shoe flat against the toe-lasting wipers. It will be understood that this operation of the presser feet 200 occurs while the depressor 226 is in its retracted or elevated position and that the pin 254 is withdrawn from the slot 262 when it is desired to operate the depressor to force a last into the upper.

For clamping the welt at the heel end of the upper against the heel-lasting wipers the illustrated machine is provided with clamping mechanism which is similar in its construction and operation to the heel-clamping mechanism disclosed in the Duplessis application above referred to. As illustrated in Fig. 15, this mechanism comprises a clamping member or plate 264 carried by an arm 266 which is journaled on a fixed cross shaft 268. The clamp is operated by a treadle 270 (Fig. 3) through connections comprising a treadle-operated member 272, a slide 274 (Fig. 2), a bell-crank lever 276 (Fig. 15), a rod 278 slidably mounted in the heel head, a link 280 connecting the rod to the bell-crank lever, and a lever 282 connecting the rod to a slide 284 which operates the clamping member. The slide 284 carries a roll 286 which operates against a downwardly extending arm 288 (Fig. 16) of a yoke 290 which is journaled on the cross shaft 268. Extending upwardly from the yoke 290 is an arm 292 which is arranged to engage one end of an arm 294 pivoted to the clamping arm 266. The arm 294 is disengaged from the arm 292 during upward or return movement of the clamping member by its spring 302 as the roll 296 on the arm 294 moves upwardly over a sharp rise of a cam surface 298 on a bracket extending upwardly from the heel head. The clamping arm 266 must be swung by hand into a horizontal position to bring the arm 294 into position to be operated on by the mechanism above described. The clamping arm 266 is provided with an adjustable stop 300 against which the heel seat portion of a last is positioned to locate the heel end of the last heightwise thereof for the lasting operation. After a last has been positioned in the supported upper and forced downwardly into the forepart of the upper by the operation of the depressor 226 the treadle 270 which operates the heel-clamping member is permitted to return to its initial position, whereupon the spring 302 (Fig. 15) returns the clamping member to its elevated position. The heel-lasting wipers are then advanced to last the welted margin of the heel portion of the upper and to position the welt for the cement attachment of an outsole thereto.

In order to support the heel portion of a last in the upper positively during the sole-laying operation the illustrated machine is provided with a heel-supporting mechanism illustrated in Fig. 13 which provides a yielding support for the heel portion of the last during the last-depressing and lasting operations but which is positively secured against downward movement after the lasting operation has been completed. This mechanism comprises a slide 304 mounted in a vertical hole in a supporting member 306 extending upwardly from the base of the heel head and yieldingly urged upwardly by a spring 308 mounted in a bore in the slide 304, the bottom portion of said spring being mounted on a pin projecting upwardly from the base of the heel head. For positively urging the slide 304 upwardly and holding it against downward movement during the sole-laying operation the treadle-operated slide 274 has pivoted to its upper end a detent 310 and the slide 304 is provided with ratchet teeth 312 which are positioned for engagement by the detent by a screw 314 mounted in the supporting member 306 and having its reduced end positioned in a groove 316 in the slide 304. The supporting member 306 is cut away at one side, as indicated at 318, to provide an opening through which the detent 310 is admitted for engagement with the ratchet teeth 312. It will be understood that the detent 310 moves upwardly with the slide 274 during the treadle operation of the heel-clamping member 264. During such upward movement of the slide 274 the detent is held from engagement with the ratchet teeth 312 by an angle plate or shield 320 (Fig. 14) which is secured to the supporting member 306 by a clamping screw 322 extending through a vertical slot 324 (Fig. 13) provided in the plate 320 and affording vertical adjustment of the plate.

For supporting the forepart of a last in the machine there is provided a toe post 326 (Figs. 2 and 4) which is substantially the same in most respects as the toe post in the machine illustrated in the Duplessis application above referred to. As illustrated in Fig. 4, the toe post 326 is supported on a horizontal arm 328 carried by a vertical slide 330 which is mounted in guideways in opposite sides of the machine frame. The slide 330 is supported by a cam segment 332 which is journaled on a horizontal shaft 334 mounted in the machine frame under the toe head and engages a roll 336 pivoted on the slide 330. When the last is being forced into the upper and thereafter during the lasting operation the toe post 326 is in the position illustrated in Fig. 4 but after the lasting operation has been completed the toe post 326 is moved upwardly by the operation of the cam segment 332 to press the last against the bottom of the toe-wiper plates and is positively supported by the segment during the sole-laying operation. In the illustrated machine the cam segment is operated by the depression of a treadle 337 which also operates a sole-laying member 338 (Fig. 2), said treadle being connected to an arm 340 (Fig. 4) on the cam segment 332 by a link 342. It will be understood that vertical adjustment of the toe post 326 is required to compensate for differences in last heights in order that the operation of the cam segment 332 may bring the bottom of the forepart of a last supported on the toe post into predetermined vertical relation to the toe wiper plates. In the illustrated machine such vertical adjustment of the toe post 326 is effected by mechanism which is substantially the same in construction and operation as the toe-post-adjusting mechanism disclosed in United States Letters Patent No. 1,373,482, granted April 5, 1921 on an application of Matthias Brock. As illustrated in Fig. 4, the toe-post-adjusting mechanism comprises a nut 344 on a threaded rod projecting downwardly from the arm 328 and provided with gear teeth which mesh with a bevel gear 346 which is operated by the handle 348. The nut 344 is fitted into an opening in the slide 330 and thus held from vertical movement relatively to the slide.

Figure 2:
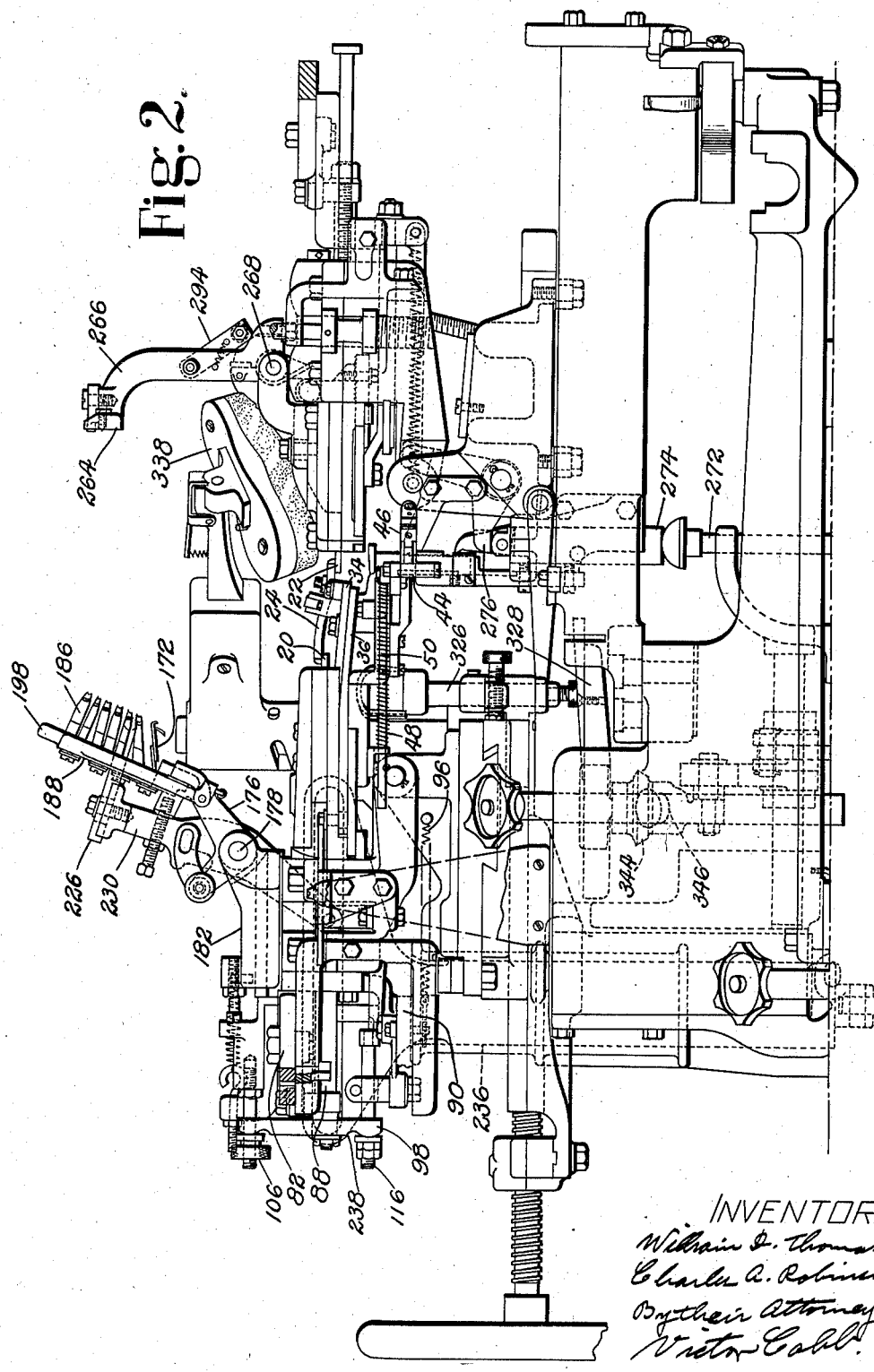
Fig. 2 is a side elevation of the upper portion of the machine illustrated in Fig. 1.

The operation of the illustrated machine has been described somewhat in the foregoing description but a more complete description of the operation may serve to promote a better understanding of the invention. A pre-welted upper is arranged in inverted position and its heel portion is positioned between the heel-lasting wipers 22 with the welt resting on the top of the wipers and the back seam arranged to register with the adjacent edges of the wipers. While the operator holds the upper in this position with his left hand he swings the heel-clamping arm 266 downwardly from its position in Fig. 15 into its position illustrated in Fig. 16 and depresses the treadle 270 (Fig. 3) thereby to impart clamping pressure to the arm 266. The arm is held in clamping position by a treadle latch (not shown). After the heel portion of the upper has been clamped against the heel wipers the forepart of the upper is accurately positioned on the toe wiper plates 20 and the forepart-clamping fingers 172 and 186 (Fig. 10) are swung downwardly from their position in Fig. 2 to their position in Fig. 10. During the downward movement of the fingers the operator swings the arms 188 which carry the side fingers 186 toward each other to position said fingers to enter the interior of the forepart of the upper. After the finger assembly has come to the limit of its downward movement the operator permits the arms 188 to be moved away from each other by the spring 194. This movement of the fingers 186 brings them into engagement with the adjacent edge faces of the welt and upper and presses the welted margin at the sides of the forepart outwardly against the wiping edges of the toe wiper plates 20. The fingers 172 and 186 are now moved downwardly to flatten the welt against the wiper plates by depressing the treadle 244 which operates the arm 230, said arm being connected to the finger assembly by the pin 254 and slot 262. While the welted margin of the upper is clamped against the wiper plates by the devices above referred to, an inverted last is moved downwardly from above the upper into the heel portion thereof and the forepart of the last is pressed downwardly between the forepart-clamping fingers 186, the toe end of the last engaging the fingers 172. The pin 254 is now withdrawn from the slot 262 to permit the last depressor 226 to be moved downwardly against the bottom of the forepart of the last by further depression of the treadle 244. The treadle 270 which operates the heel-clamping arm 266 is now released, thus permitting the return of the clamping arm to its position illustrated in Fig. 2, whereupon the heel wipers are advanced to the limit of their overwiping movement. The toe wipers 20 are then partially advanced, the fingers 172 and 186 yielding to permit the wipers to move inwardly over the last bottom. After the toe wipers have been advanced sufficiently to hold the last in the upper, the welt-engaging fingers, together with the depressor 226, are returned to their positions illustrated in Fig. 2 by the operation of the treadle spring 250 (Fig. 3), whereupon the advancement of the toe wipers 20 is completed. During the advancement of the toe wipers the side wipers 24 are correspondingly advanced by the spring 96 (Figs. 2 and 6). After the toe wipers have been fully advanced the side wipers 24 may be further advanced by the operation of the lever 90 illustrated in Fig. 6 or, if desired, they may be retracted by the operation of the lever 90, for example, to permit a rearrangement of the side portions of the welted margin for the reception of the side wipers. After the lasting has been completed the operator again depresses the lever 270 (Fig. 3) to press the heel rest 304 upwardly against the cone of the last, in which position the heel rest is positively held from downward movement by the treadle latch. An outsole to which cement has been applied is now positioned on the welted margin of the upper and the sole-laying member 338 is swung around from its position in Fig. 1 into position to operate on the sole, whereupon the treadle 337 is depressed to bring the member 338 forcibly into engagement with the sole thereby to effect cement attachment of the sole to the welt and to a filler or insole on the last bottom. The treadle 337 also operates through the mechanism illustrated in Fig. 4 to force the forepart of the last upwardly and to hold it positively for the sole-laying operation, such upward movement of the last occurring before any substantial pressure is brought to bear against the sole by the member 338.

Having thus described our invention, what we claim as new and desire to secure by Letters Patent of the United States is:

1. In a machine for use in the manufacture of pre-welted shoes, a plate constructed and arranged to support a pre-welted upper by engagement within the welt crease, means constructed and arranged to press the welt against the supporting plate and to hold it against said plate while a last is forced into the supported upper, a depressor for forcing a last into the supported upper, an actuator, connections from the actuator to the depressor, and connections from the actuator to the welt pressing means whereby said welt pressing means is operated while the depressor remains in retracted position, said connections to the welt pressing means including means disengageable at the will of the operator to permit operation of the depressor.

2. In a machine for use in the manufacture of pre-welted shoes, means constructed and arranged to support a pre-welted upper by engagement within the welt crease, a depressor for forcing a last into the supported upper, means for pressing the welt against the welt-supporting means, an actuator, connections from the actuator to the depressor, connections from the actuator to the welt-pressing means whereby said welt-pressing means is operated while the depressor remains in retracted position, means for retracting the depressor, and means for causing the welt-pressing means to be retracted by the retraction of the depressor substantially to the same extent as the depressor is retracted.

3. In a machine for making pre-welted shoes, means for supporting a pre-welted upper by engagement within the welt crease, means for engaging the welted margin at one end of the upper and pressing the upper lengthwise thereof against the supporting means, means for engaging the welted margin at opposite sides of the upper, the last-mentioned welt engaging means being relatively movable widthwise of the upper thereby to press said side portions of the welted margin against the work supporting means.

4. In a machine for use in the manufacture of pre-welted shoes, work supporting plates constructed and arranged to engage a pre-welted upper within the welt crease, a device constructed and arranged to engage the welted margin at one end of the upper and press said welted margin against the work supporting plate, devices constructed and arranged to engage the welted margin at opposite sides of the upper, and carriers for said devices constructed and arranged for movement toward and from each other widthwise of the upper.

5. In a machine for use in the manufacture of pre-welted shoes, work supporting plates constructed and arranged to engage a pre-welted upper within the welt crease, a device constructed and arranged to engage the welted margin at one end of the upper and press said welted margin against the work supporting plate, devices constructed and arranged to engage the welted margin at opposite sides of the upper, carriers constructed and arranged for movement toward and from each other widthwise of the upper, and yielding means for moving said carriers from each other, thereby to cause the devices carried thereby to press the welted margin of the upper outwardly against the work supporting plates.

6. In a lasting machine, a work support, a vertical carrier for the work support on which said support is adjustable heightwise of an upper in the machine, a cam for holding the carrier against downward movement, and manually operated means for operating the cam thereby to lift the work support into a predetermined position heightwise of a shoe in the machine.

7. In a lasting machine, a work support, a cam for holding the work support against downward movement, manually operated means for operating the cam thereby to lift the work support into a predetermined position heightwise of a shoe in the machine, a presser constructed and arranged to operate on the bottom of a shoe in the machine, and connections from said manually operated means for operating said presser.

8. In a lasting machine, a presser constructed and arranged to operate on a shoe in the machine, a work support, means for adjusting the work support heightwise of the shoe, an actuator, connections from the actuator to the work support for moving it upwardly to a predetermined extent and positively holding it against downward movement by the presser, and connections from the actuator to the presser.

9. In a lasting machine, work-supporting means comprising a fixture, a work-supporting slide mounted on the fixture for movement heightwise of a shoe in the machine, yielding means for moving the slide into engagement with the shoe, manually operated means for positively pressing the slide against the shoe, and means for positively holding the slide from return movement.

10. In a lasting machine, work-supporting means comprising a fixture, a work-supporting slide mounted on the fixture for movement heightwise of a shoe in the machine, yielding means for moving the slide into engagement with the shoe, an actuator for positively pressing the slide against the shoe, pawl and ratchet connections between the actuator and the slide, and means for maintaining disengagement of the pawl and ratchet during an initial movement of the slide.

11. In a lasting machine, a heel rest, heel-lasting wiper plates, means for clamping an outwardly extending flange of an upper in the machine against the heel wipers, an actuator, operating connections from the actuator to said clamping means, and connections from the actuator to the heel rest whereby advancement of the actuator presses the heel rest against a last in the upper.

12. In a lasting machine, a heel rest, heel-lasting wiper plates, means for clamping an outwardly extending flange of an upper in the machine against the heel wipers, an actuator, operating connections from the actuator to the clamping means which are inoperative when the clamping means is fully retracted but are rendered operative by a partial advancement of said clamping means, connections from the actuator to the heel rest for pressing the heel rest against a last in the upper, said connections being inoperative when said clamping means is in clamping engagement with the upper while rendered operative by retraction of said clamping means.

13. In a lasting machine, a heel rest, heel-lasting wiper plates, means for clamping an outwardly extending flange of an upper in the machine against the heel wipers, an actuator, operating connections from the actuator to the clamping means which are inoperative when the clamping means is fully retracted but are rendered operative by a partial advancement of said clamping means, pawl and ratchet connections from the actuator to the heel rest, and means for maintaining disengagement of said pawl and ratchet means during the advancement of the actuator to operate said clamping means.

14. In a machine for lasting pre-welted shoes, lasting wipers constructed and arranged to engage a pre-welted upper within the welt crease, a clamp constructed and arranged to engage the sole-attaching face of the welt of a supported upper and to hold the welt against the wiper plates, a support for a last in the upper, an actuator, connections from the actuator to the last support, and connections from the actuator to the clamping member, the latter connections being inoperative until the clamping member is partially advanced by hand and the former connections being inoperative while the actuator is operating on the clamping member.

15. In a machine for lasting pre-welted shoes, heel-lasting wipers constructed and arranged to support the heel portion of a pre-welted upper by engagement within the welt crease, a clamping member constructed and arranged to engage the sole-attaching face of the welt at the heel end of the upper and hold the welt against the heel wipers, a presser member constructed and arranged to engage the cone of a last in the upper and press the last upwardly against the heel wipers after said wipers have been at least partially advanced, an actuator, connections from the actuator to the clamping member which are inoperative until the clamping member has been partially advanced by hand, and connections from the actuator to the presser member including a detent and ratchet which are held from engagement with each other while the actuator is operatively connected to the clamping member.

16. In a lasting machine, end-lasting wipers, side-lasting wipers, automatic means for yieldingly advancing the side wipers, an actuator for advancing and retracting the end wipers, and means operated by the actuator during its retracting movement for retracting the side wipers.

17. In a lasting machine, end-lasting wipers, side-lasting wipers, an actuator for the end-lasting wipers, and automatic means for yieldingly advancing the side wipers, the advancement of the side wipers being controlled by said actuator.

18. In a lasting machine, end-lasting wipers, side-lasting wipers, an actuator for the end-lasting wipers, a slide, connections from the slide for operating the side wipers, means operating yieldingly on the slide to advance the side wipers, and connections from the actuator to the slide which operate during the retraction of the actuator to retract the slide but do not limit the advancement of the actuator.

19. In a lasting machine, end-lasting wipers, side-lasting wipers, an actuator for the end wipers, a slide, operating connections from the slide to the side wipers, a spring for advancing the slide, and a lever constructed and arranged to be operated by the actuator during its retraction to retract the slide, said lever being operated by the actuator during its advancement to control the advancement of the slide.

20. In a lasting machine, end-lasting wipers, side-lasting wipers, an actuator for the end wipers, a slide, operating connections from the slide to the side wipers, a spring for advancing the slide, a lever constructed and arranged to be operated by the actuator during its retraction to retract the slide, said lever being operated by the actuator during its advancement to control the advancement of the slide, said actuator being free to advance after the advancement of the side wipers has been arrested, and means for positively advancing the side wipers after the end wipers have come to the limit of their advancement.

21. In a lasting machine, the combination with toe-lasting wipers, heel-lasting wipers, and side-lasting wipers which together provide a complete enclosure for a shoe in the machine, of means for simultaneously advancing the toe wipers and the side wipers, and manually-operated means for operating the side wipers independently of the toe wipers.

22. In a lasting machine, the combination with toe-lasting wipers, heel-lasting wipers, and side-lasting wipers which are supported by the toe wipers and the heel wipers and bridge the space between the toe wipers and the heel wipers, of manually-operated means for advancing the toe wipers, automatic means for advancing the side wipers simultaneously with the advancement of the toe wipers, and manually-operated means for further advancing the side wipers.

23. In a lasting machine, the combination with end-lasting wipers and shank-lasting wipers, of an actuator for the shank-lasting wipers, and operating connections from the actuator to the wiper at the outside of the shank of a shoe in the machine having a predetermined lost motion during which the shank wiper at the inside of the shank of the shoe advances to a predetermined extent while the shank wiper at the outside of the shank remains at rest.

24. In a lasting machine, the combination with end-lasting wipers and shank-lasting wipers, of means for operating the shank-lasting wipers comprising an actuator and connections from the actuator to each of the shank wipers including a lever and a link extending from the lever to the wiper, the shank wiper at the outside of the shoe in the machine having a pin-and-slot connection with said link, and yielding means for moving the shank wiper toward the shoe to the limit afforded by said pin-and-slot connection.

25. In a lasting machine, the combination with end-lasting wipers, of a side-lasting wiper supported upon the end-lasting wipers, a carrier for the side wiper and a holddown on the carrier constructed and arranged to engage the upper surface of the side wiper and to hold the side wiper from bodily upward movement while permitting it to rock against the holddown to adjust itself to the varying elevations of the end-lasting wipers.

26. In a lasting machine, the combination with end-lasting wipers, of a side-lasting wiper the end portions of which are supported by the end wipers, a carrier for the side wiper, and a holddown finger for holding the wiper from bodily upward movement, said finger being mounted on the carrier for movement to and from operative position.

27. In a lasting machine, the combination with end-lasting wipers, of a side-lasting wiper the end portions of which are supported by the end-lasting wipers, a carrier whereby the outer margin of the side wiper is supported at a point between its ends, and a holddown on the carrier constructed and arranged to prevent bodily upward movement of the side wiper while permitting rocking movement of the side wiper on the carrier lengthwise of a shoe in the machine.

28. In a lasting machine, the combination with end-lasting wipers, of a side-lasting wiper the end portions of which are supported by the end-lasting wipers, a carrier whereby the outer margin of the side wiper is supported substantially midway between its ends, a holddown on the carrier constructed and arranged to prevent bodily upward movement of the side wiper while permitting rocking movement of the side wiper on the carrier lengthwise of a shoe in the machine, and connections between the carrier and the side wiper for holding the side wiper from bodily movement lengthwise of the shoe.

29. In a lasting machine, a lasting wiper, a carrier therefor, means for holding the wiper from bodily upward movement relatively to the carrier comprising a finger pivoted to the carrier for swinging movement in a plane extending upwardly from the wiper, and means for holding the finger in engagement with the upper surface of the wiper.

30. In a lasting machine, a lasting wiper, a carrier therefor, means for holding the wiper from bodily upward movement relatively to the carrier comprising a finger mounted in the carrier for movement in a plane extending upwardly from the wiper, and means for positively holding the finger from upward movement relatively to the carrier after it has been moved downwardly into engagement with the upper surface of the wiper.

31. In a lasting machine, a lasting wiper, a carrier therefor, means for holding the wiper from bodily upward movement relatively to the carrier comprising a finger pivoted to the carrier for swinging movement in a plane extending upwardly from the wiper, and a latch constructed and arranged to operate as the finger is moved downwardly into engagement with the upper surface of the wiper to hold the finger positively from return movement.

32. In a machine for use in the manufacture of pre-welted shoes, a plate constructed and arranged to support a pre-welted upper by engagement within the welt crease, means constructed and arranged to press the welt against the supporting plate and to hold it against said plate while a last is forced into the supported upper, a depressor for forcing a last into the supported upper, an actuator, connections from the actuator to the depressor, connections from the actuator to the welt-pressing means whereby said welt-pressing means is operated while the depressor remains in retracted position, and members provided in the welt-pressing device and the depressor and constructed and arranged to be so positioned during the advancement of the depressor that they engage during the retraction of the depressor whereby retraction of the depressor also retracts the welt-pressing device.

33. In a lasting machine, the combination with a toe head and a heel head relatively movable lengthwise of a shoe in the machine, of a side-lasting wiper carried by the toe head and means operated by said relative movement of the toe head and heel head for effecting relative movement of the side wiper and the toe head lengthwise of the shoe, said means including a member carried by the toe head, and means carried by the heel head for engaging said member at different positions lengthwise of the shoe relatively to the heel head.

WILLIAM D. THOMAS.
CHARLES A. ROBINSON.